(12) United States Patent
Noble

(10) Patent No.: US 9,579,960 B1
(45) Date of Patent: Feb. 28, 2017

(54) EASY ON / EASY OFF WINDSCREEN

(71) Applicant: Terry B. Noble, Park Hill, OK (US)

(72) Inventor: Terry B. Noble, Park Hill, OK (US)

( * ) Notice: Subject to any disclaimer, the term of this patent is extended or adjusted under 35 U.S.C. 154(b) by 0 days.

(21) Appl. No.: 14/625,012

(22) Filed: Feb. 18, 2015

Related U.S. Application Data

(63) Continuation-in-part of application No. 13/748,806, filed on Jan. 24, 2013, now abandoned.

(60) Provisional application No. 61/618,719, filed on Mar. 31, 2012.

(51) Int. Cl.
*B60J 7/22* (2006.01)
*B62D 35/00* (2006.01)

(52) U.S. Cl.
CPC ............. *B60J 7/223* (2013.01); *B62D 35/00* (2013.01)

(58) Field of Classification Search
CPC .................................. B60J 7/223; B62D 35/00
See application file for complete search history.

(56) References Cited

U.S. PATENT DOCUMENTS

| | | | |
|---|---|---|---|
| 4,226,463 A | 10/1980 | Gager, Jr. | |
| 4,850,637 A | 7/1989 | Carlino | |
| 5,702,150 A | 12/1997 | Reuter et al. | |
| 5,746,472 A | 5/1998 | Rogers | |
| 7,097,233 B2 | 8/2006 | Sogame et al. | |

*Primary Examiner* — Glenn Dayoan
*Assistant Examiner* — Melissa A Black
(74) *Attorney, Agent, or Firm* — Molly D. McKay

(57) ABSTRACT

An easily installed and removable wind deflecting device that also provides noise reduction and temperature control within the cockpit of a convertible automobile. The invention includes two major components: fitted vinyl or leather seat caps attached to a yoke and an auto safety glass wind diverter panel. The seat caps are jointed together by the yoke and a bottom yoke flap that extends downward to the center console of an automobile. The seat caps fit over the headrest portion of seats and removably secure the invention to the seats. The panel is held in place by snaps attached to a cooperating pair of central flaps provided on the yoke such that the snaps secure together through holes provided in the edge of the safety glass. Access openings provided in the back of the seat caps allow access to controls located on the headrest of the seats.

12 Claims, 3 Drawing Sheets

EASY ON / EASY OFF WINDSCREEN

CROSS-REFERENCE TO RELATED APPLICATIONS

The present application is a continuation in part of U.S. patent application Ser. No. 13/748,806 for Easy On/Easy Off Windscreen that was filed on Jan. 24, 2013, which in turn claims priority to U.S. Provisional Patent Application No. 61/618,719 filed on Mar. 31, 2012.

BACKGROUND OF THE INVENTION

1. Field of the Invention

The invention is a removable wind deflecting or blocking device that is suspended between the front seats of a convertible automobile to rerouting the airflow that normally occurs between, around and over top of the seatbacks.

2. Description of the Related Art

The idea for this windscreen evolved when my wife and I were enjoying a day out driving in our Corvette convertible. As we returned home late in the evening, the air had become much cooler. Rather than put the top up, between the two of us we wrapped a blanket around the seatbacks of the car, then leaned back on them in order to keep the blanket somewhat in place. This drastically changed the airflow, the wind noise, and the temperature within the car. It also made it possible for my wife to wear her long hair completely down, with no need for a cap, hair clip, or ponytail holder. Following this night, I began to research the available of products used for this purpose and found them to be lacking in the aspects of appearance, efficiency, and installation.

Thus, I developed the present invention which is highly efficient in reducing wind flow and wind noise within the car. And because it allows the temperature to remain easily controlled and thus more constant within the car (warmer or cooler depending on the season), it vastly extends our ability to use and enjoy our convertible car.

The invention is subtle and attractive; therefore it never detracts or draws attention away from the beauty of the automobile. Installation involves only the fitting of the vinyl seat-caps over the headrest portion of the car seats much like a stocking cap fits on the human head. The invention requires no modifications to the interior of the car or use of bolts, screws, straps, etc. to secure it.

Due to the use of auto safety glass, visibility is never obstructed, and the design of the invention allows for the convertible top to be raised or lowered easily and safely with the windscreen remaining in place. When one wishes to remove the invention, it lays completely flat and takes up very little space, allowing it to be easily stored in the trunk of the car.

SUMMARY OF THE INVENTION

The present invention is an easily installed and removable wind deflecting device that also provides noise reduction and temperature control within the cockpit of the automobile. The invention includes two major components: fitted vinyl/leather seat caps attached to a yoke with a central yoke flap and auto safety glass. The seat caps are jointed together by a yoke that includes a yoke flap that extends downward to the center console of an automobile. The seat caps fit snuggly over the headrest portion of seats and removably secure the invention to the seats. Auto safety glass is held in place by snaps attached to a cooperating pair of central flaps provided on the yoke such that the snaps secure together through holes provided in the edge of the safety glass. The auto safety glass which is suspended between the automobile seats by the yoke serves to deflect and reroute normal airflow between, around and over the seatbacks. This invention is designed for us on all open-air or convertible automobiles.

DETAILED DESCRIPTION OF THE PREFERRED EMBODIMENT

Figure 1:
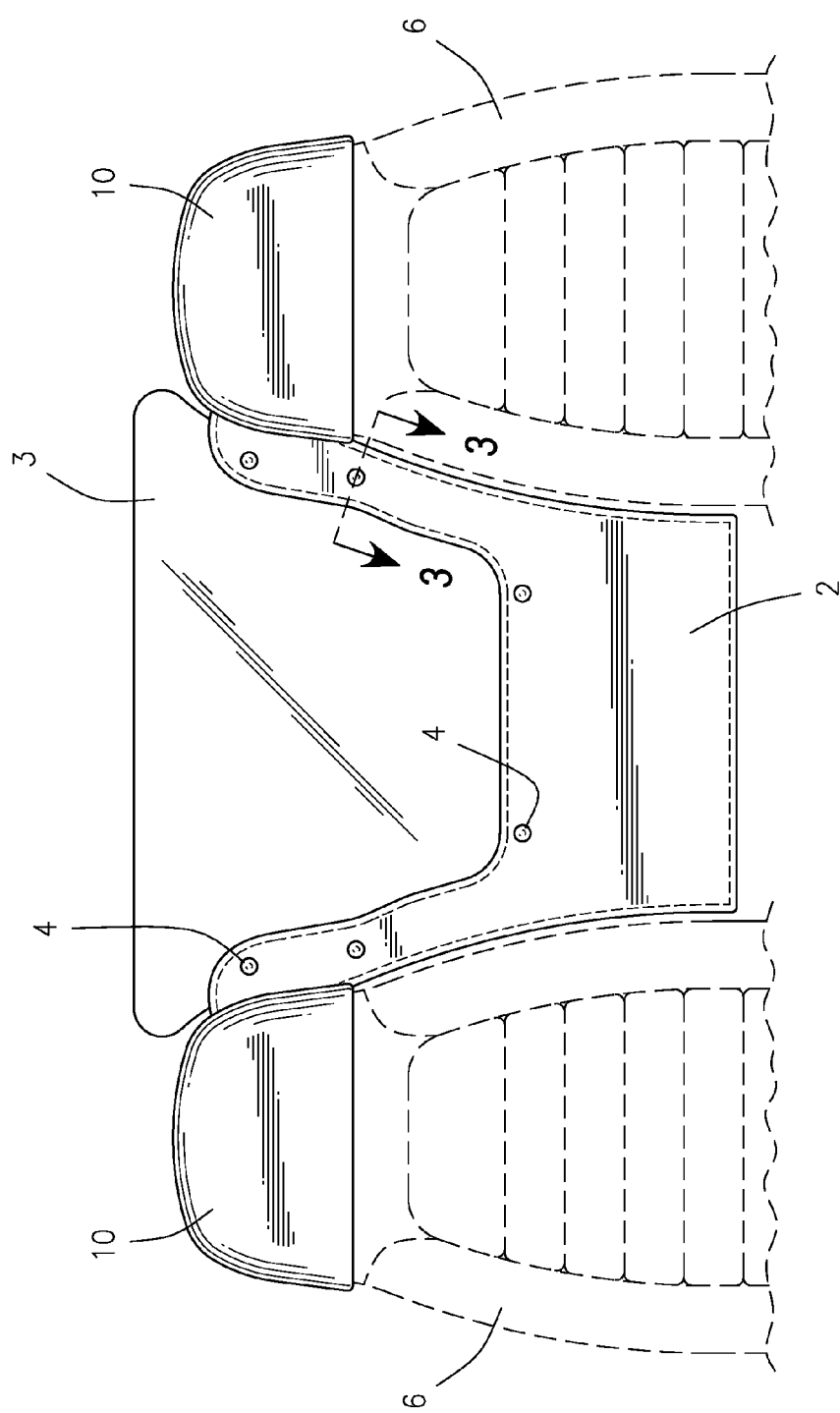
FIG. 1 is a front view of an easy on/easy off windscreen that is constructed in accordance with a preferred embodiment of the present invention. The windscreen is shown attached to the headrest portions of seats of an automobile.

The invention is an easily installed, easily removable wind deflecting and blocking device or windscreen 1 that is suspended between the front seats 6 of any convertible automobile. The windscreen 1 functions to reroute the airflow that normally occurs between, around and over top of the backs of the seats 6. In addition to vastly reducing the airflow within the automobile, the windscreen 1 also provides noise reduction and greatly extends the convertible "season" by regulating and maintaining the temperature within the cockpit of the automobile.

The windscreen 1 is comprised of two major components: a yoke 2 and a wind deflector panel 3. The yoke 2 is centrally located between a pair of fitted vinyl or leather seat caps 10 which are joined together in spaced apart arrangement on the top of the yoke 2. The yoke 2 is preferably constructed of a somewhat flexible materials such as vinyl or leather. The yoke 2 is provided with a wind reducing flap at its bottom that extends downward to or below the center console 8 of the automobile to make a tight fit. Each of the seat caps 10 is open on its bottom side and fits snuggly over the headrest portion of one of the seats 6 much like a stocking cap fits over the human head.

The yoke 2 lies between the two seat caps 10, and is fitted with a cooperating pair of central flaps: a front central flap 7B and a rear central flap 7A. The central flaps 7A and 7B contain snaps 4 or other suitable fastening means by which the wind deflector panel 3, is held in place within the central open area of the yoke 2. The wind deflector panel 3 is preferably constructed of automotive safety glass, and it is positioned directly between the two front seats 6 of the automobile when it secured in the automobile by the yoke 2.

The safety glass has a series of approximately six to eight holes 5 drilled into its side edges. The number of holes 5 may be more or less, depending on the configuration of glass needed for any model of convertible car. The snaps 4 that are attached to the central flaps 7A and 7B of the yoke 2 secure or snap together through the holes 5 in the safety glass panel 3 to secure the glass panel 3 within the vinyl yoke 2 and to suspending it between the seats 6 of the automobile.

Figure 2:
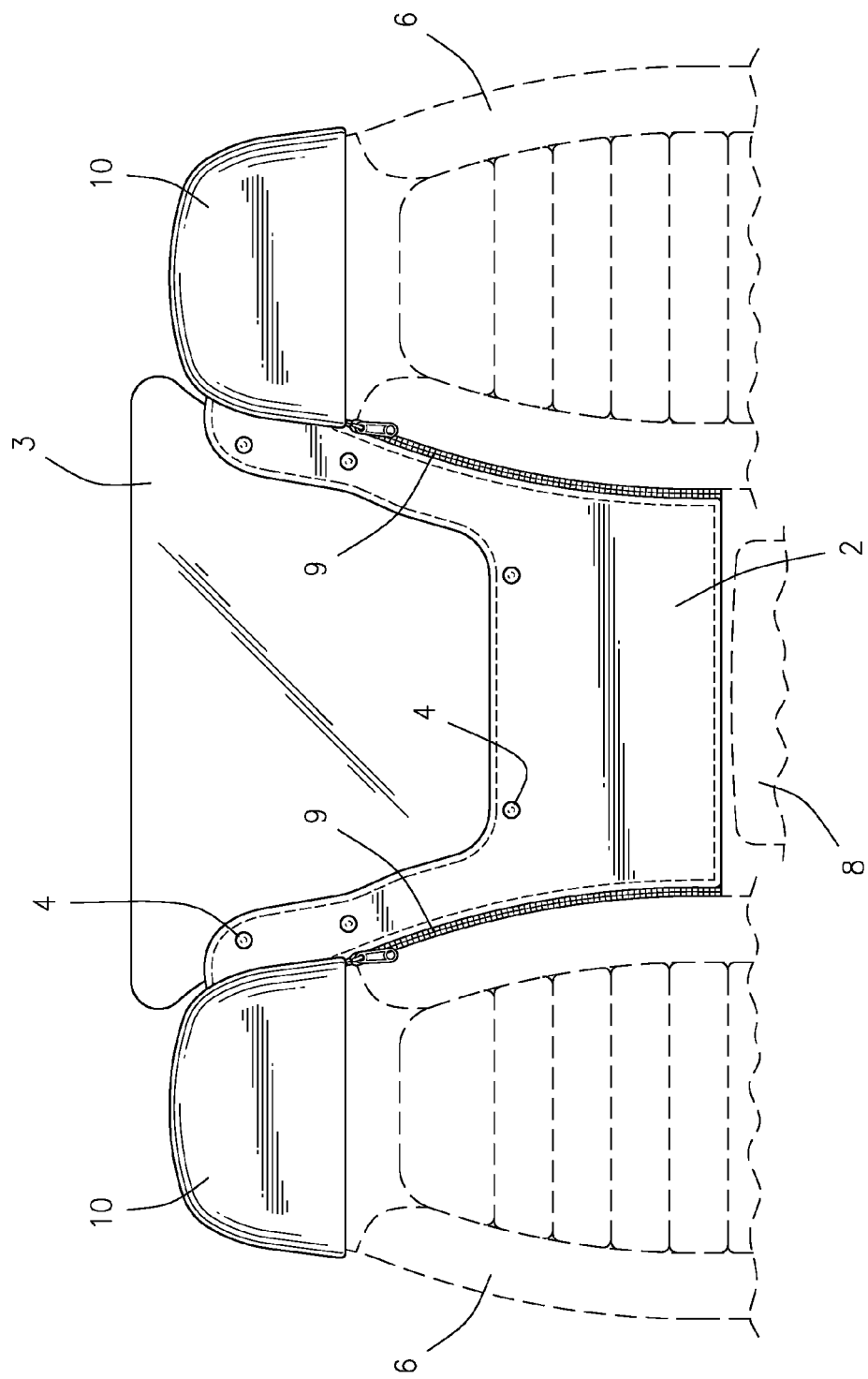
FIG. 2 is a perspective view of factory issued or custom designed seats equipped with permanent zippers or snaps to secure the windscreen to the sides of the automobile seats.
Figure 3:
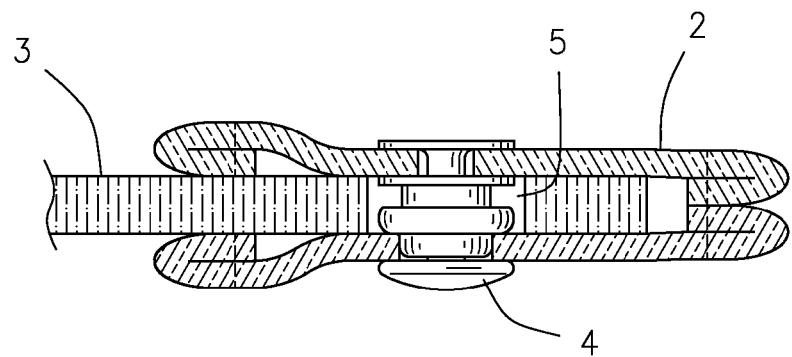
FIG. 3 is a cross sectional view of the invention taken along line 3-3 of FIG. 1.
Figure 4:
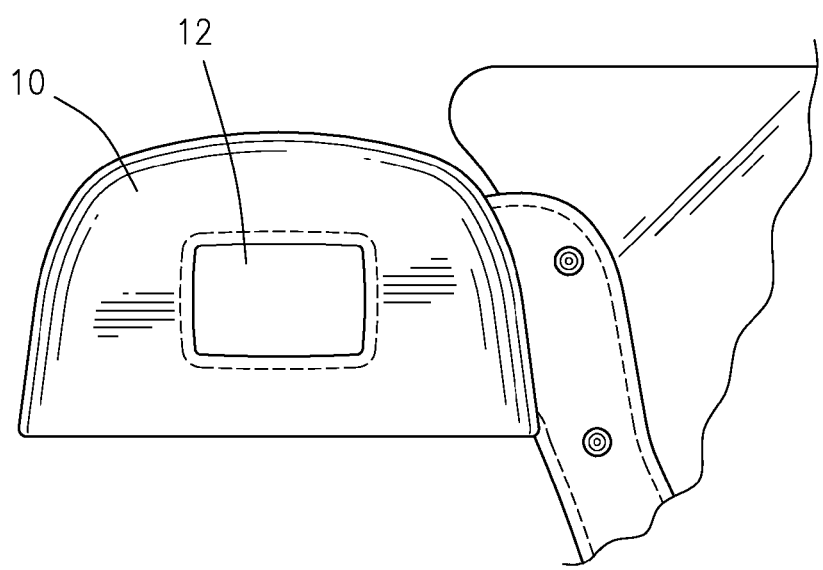
FIG. 4 is an enlarged rear view of a portion of one of the fitted seat caps from FIG. 1 shown removed from the automobile.

This windscreen 1 is for use with all open-air and convertible automobiles. As shown in FIG. 2, variations of the original invention will include factory or custom built seats provided on the automobile that are equipped that are fitted with snaps or zippers 9 permanently in place for attaching the sides of the yoke or the wind deflector panel to the seats. Additionally, holes 12 may be provided in the back of the fitted seat caps 10 to provide the user with access to seat release mechanisms that are provided on the headrest portion of the seats 6 of some automobiles. Also, although not illustration, variations of the original invention may include seat caps permanently fixed to the headrest portion of the seats.

Although the invention has been described as attaching to the front seats of an automobile, the invention is not so limited and can be attached to rear seats in those automobiles with rear seats.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An auto safety glass wind diverter for an open top vehicle comprising:
    fitted seat caps removably attached to each of two head rests of front seats of an open top vehicle, a u-shaped contoured yoke attached to said seat caps and positioned between said front seats, said yoke includes a descending yoke flap that engages the console area located between the front seats of said vehicle and extends downward below said console to make a tight fit with the console,
    said u-shaped yoke provided with a front coordinating central flap and a rear coordinating central flap surrounding a u-shaped contoured area of the yoke, and
    a wind diverter panel removably attached to said contoured area of said yoke via said front and rear coordinating central flaps.

2. An auto safety glass wind diverter according to claim 1 further comprising:
    said wind diverter panel constructed of auto safety glass, said wind diverted provided with holes around a perimeter of said wind diverter panel, said holes being in alignment with fasteners attached to said front coordinating central flap and to said rear coordinating central flaps of said yoke so that the fasteners extend through the holes to secure said diverter panel within the contoured area of said yoke and to suspend said diverter panel via said yoke between said front seats of said vehicle.

3. An auto safety glass wind diverter according to claim 1 wherein an access hole is provided in the back of the fitted seat caps to provide access to seat controls provided on the back of the headrest portion of the seats.

4. An auto safety glass wind diverter for an open top vehicle comprising:
    a u-shaped yoke permanently secured to adjoining sides of two front seats of an open top vehicle,
    fastener means securing a wind diverter panel within the u-shaped yoke so that the wind diverter panel is located between the two seats,
    said fastener means removably engagable with a perimeter of said yoke, said yoke provided with a wind reducing flap that extends between the two front seats and extends downward to a central console area of the vehicle and extends downward below said console to make a tight fit with the console,
    said yoke provided with an upwardly opening u-shaped gap, and
    said wind diverter panel removably securable within the u-shaped gap.

5. An auto safety glass wind diverter according to claim 4 wherein said wind diverter panel is constructed of safety glass.

6. An auto safety glass wind diverter for an open top vehicle according to claim 5 wherein said wind diverter panel extends above said front seats.

7. An auto safety glass wind diverter for an open top vehicle comprising:
    fitted seat caps removably securable over each of two head rests on front seats of an open top vehicle, a u-shaped contoured yoke attached to said seat caps and positioned between said front seats so that the yoke completely fills the gap between the two front seats, a descending yoke flap provided on a lower portion of said yoke that extends down to a center console area of said vehicle and extends downward below said console to make a tight fit with the console,
    said u-shaped yoke provided with a front coordinating central flap and a rear coordinating central flap surrounding a central upward facing u-shaped gap provided in the yoke, and
    a wind diverter panel removably insertable between the front and rear flaps to fill the u-shaped gap of said yoke.

8. An auto safety glass wind diverter according to claim 7 wherein said wind diverter panel is constructed of auto safety glass.

9. An auto safety glass wind diverter according to claim 7 further comprising:
    said wind diverted provided with holes around a perimeter of said wind diverter panel, said holes being in alignment with fasteners attached to said front coordinating central flap and to said rear coordinating central flap of said yoke so that the fasteners extend through the holes to secure said wind diverter panel within the u-shaped gap of said yoke to suspend said wind diverter panel via the yoke between said front seats of said vehicle.

10. An auto safety glass wind diverter for an open top vehicle according to claim 9 wherein said wind diverter panel extends above said front seats.

11. An auto safety glass wind diverter according to claim 10 wherein said wind diverter panel is constructed of safety glass.

12. An auto safety glass wind diverter according to claim 7 wherein an access hole is provided in the back of the fitted seat caps to provide access to seat controls provided on the back of the headrest portion of the seats.

* * * * *